July 6, 1926.
W. L. MOORE
1,591,874
METAL WORKING MACHINE
Filed Jan. 20, 1922  4 Sheets-Sheet 1
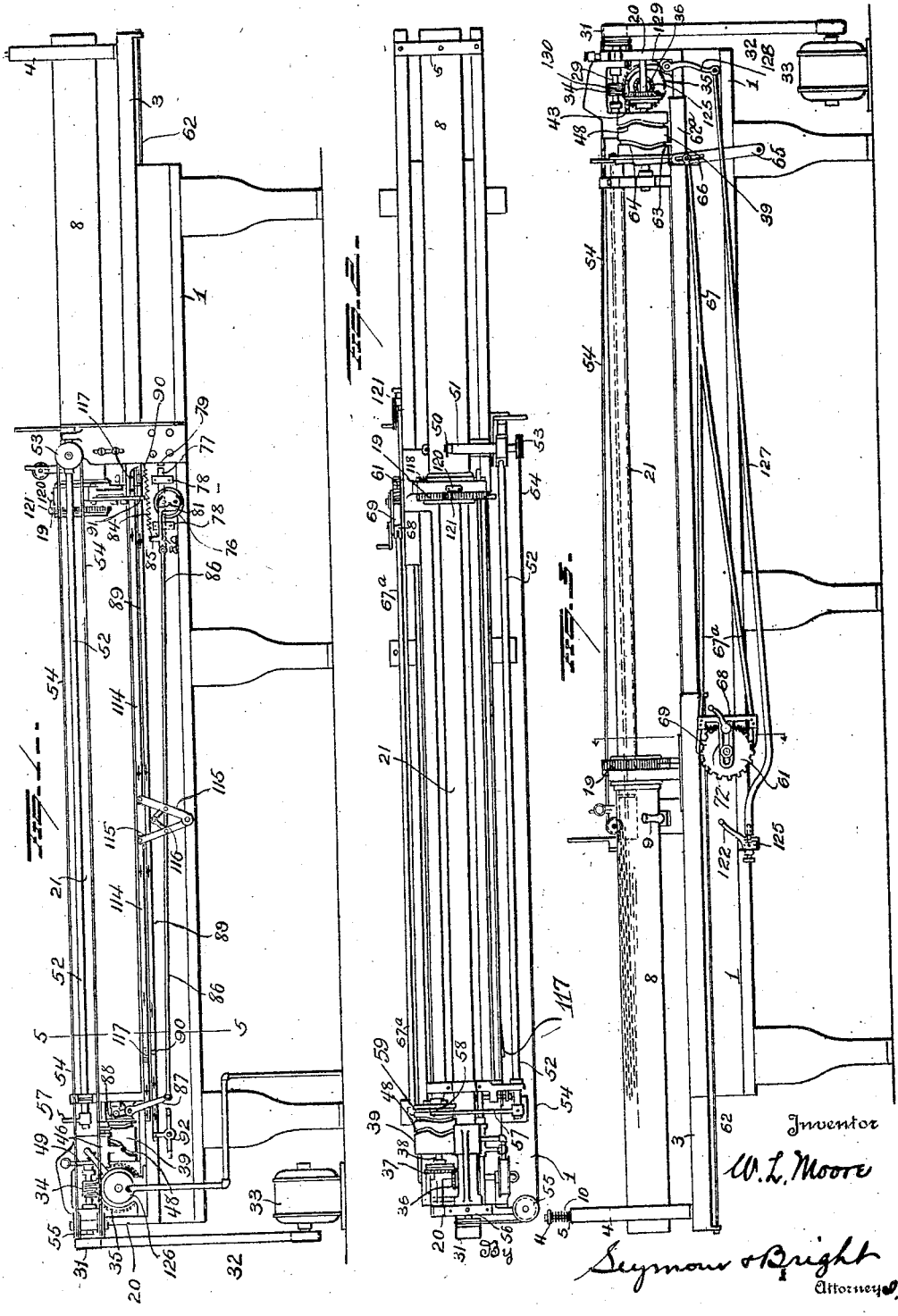

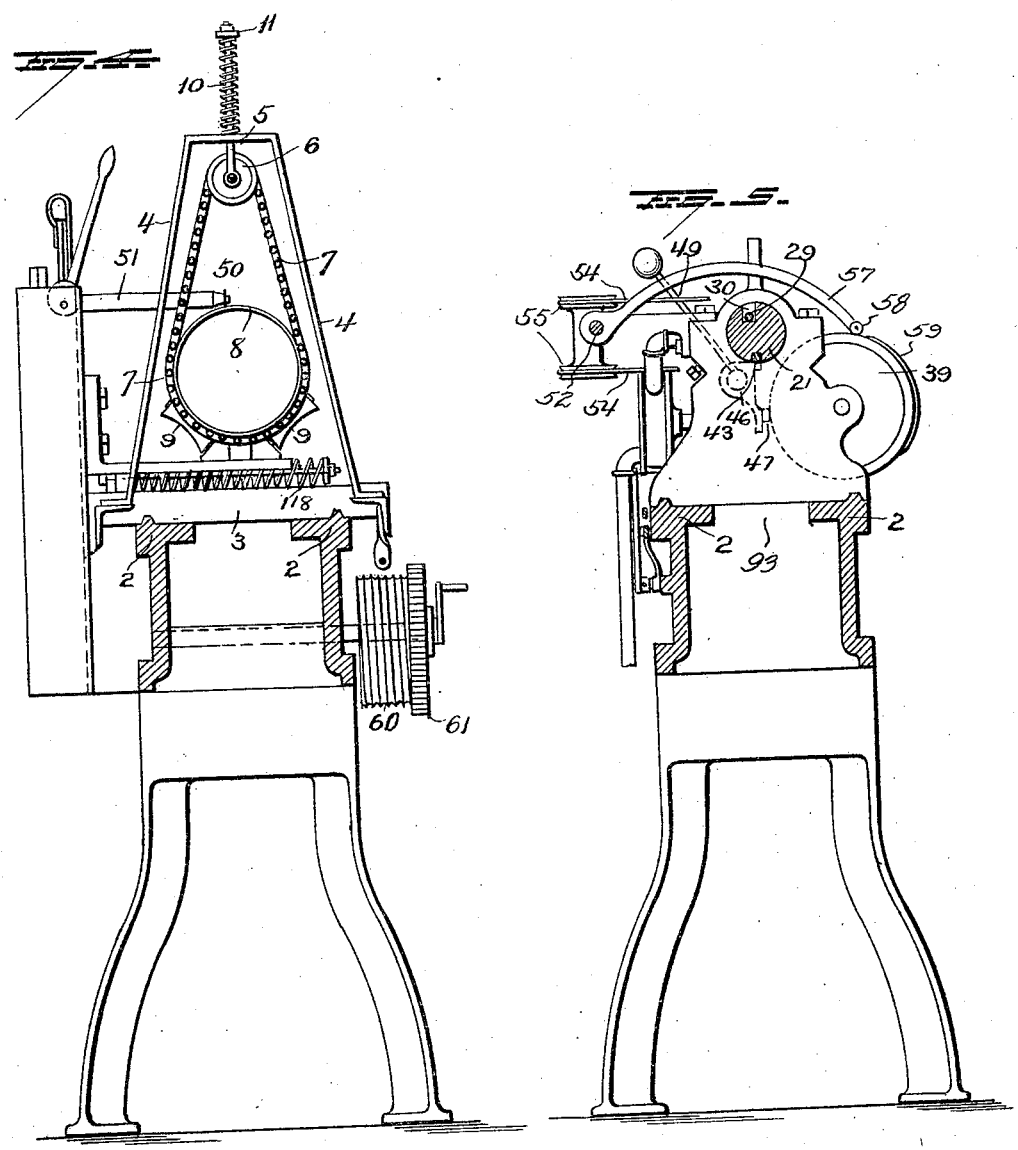

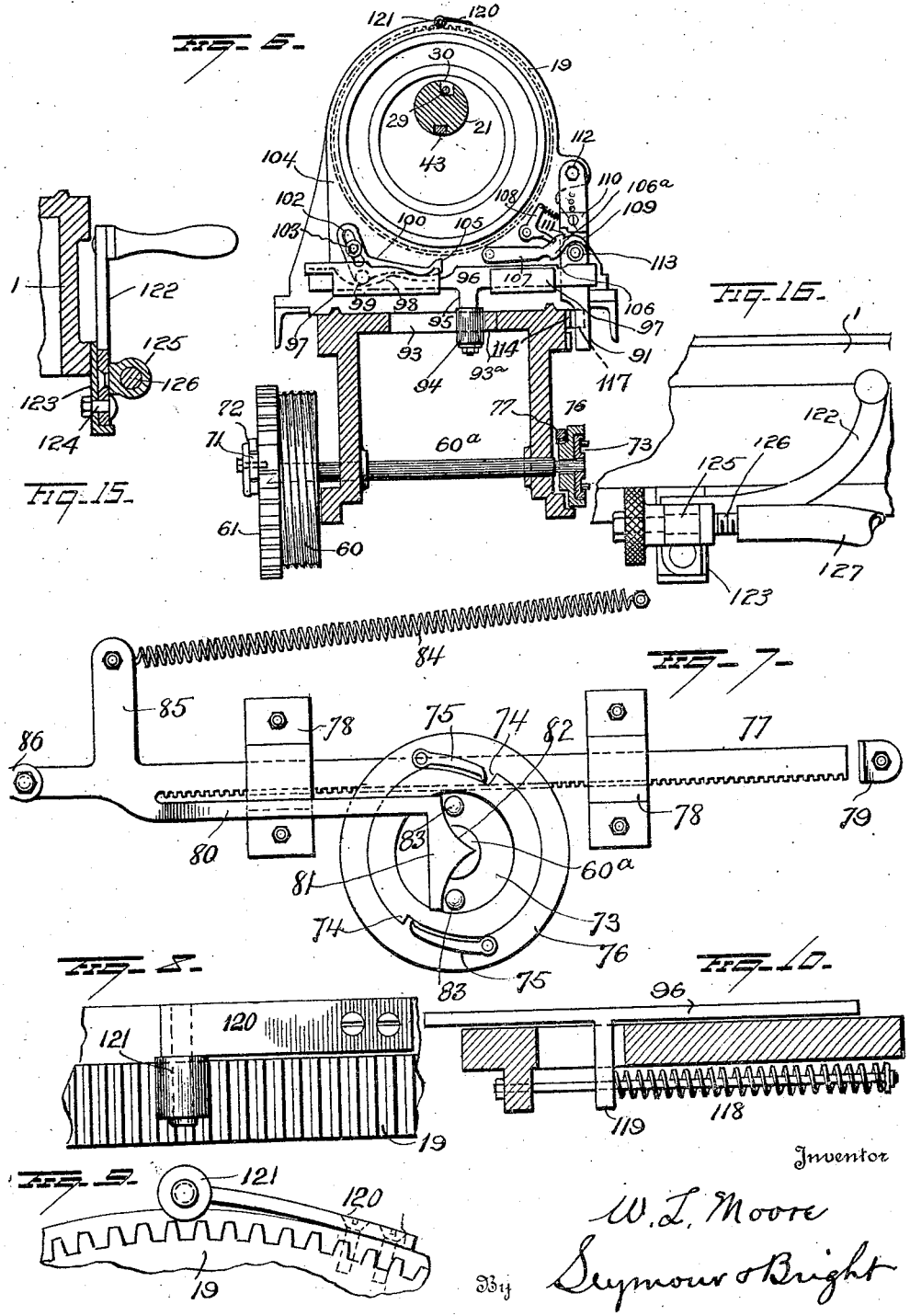

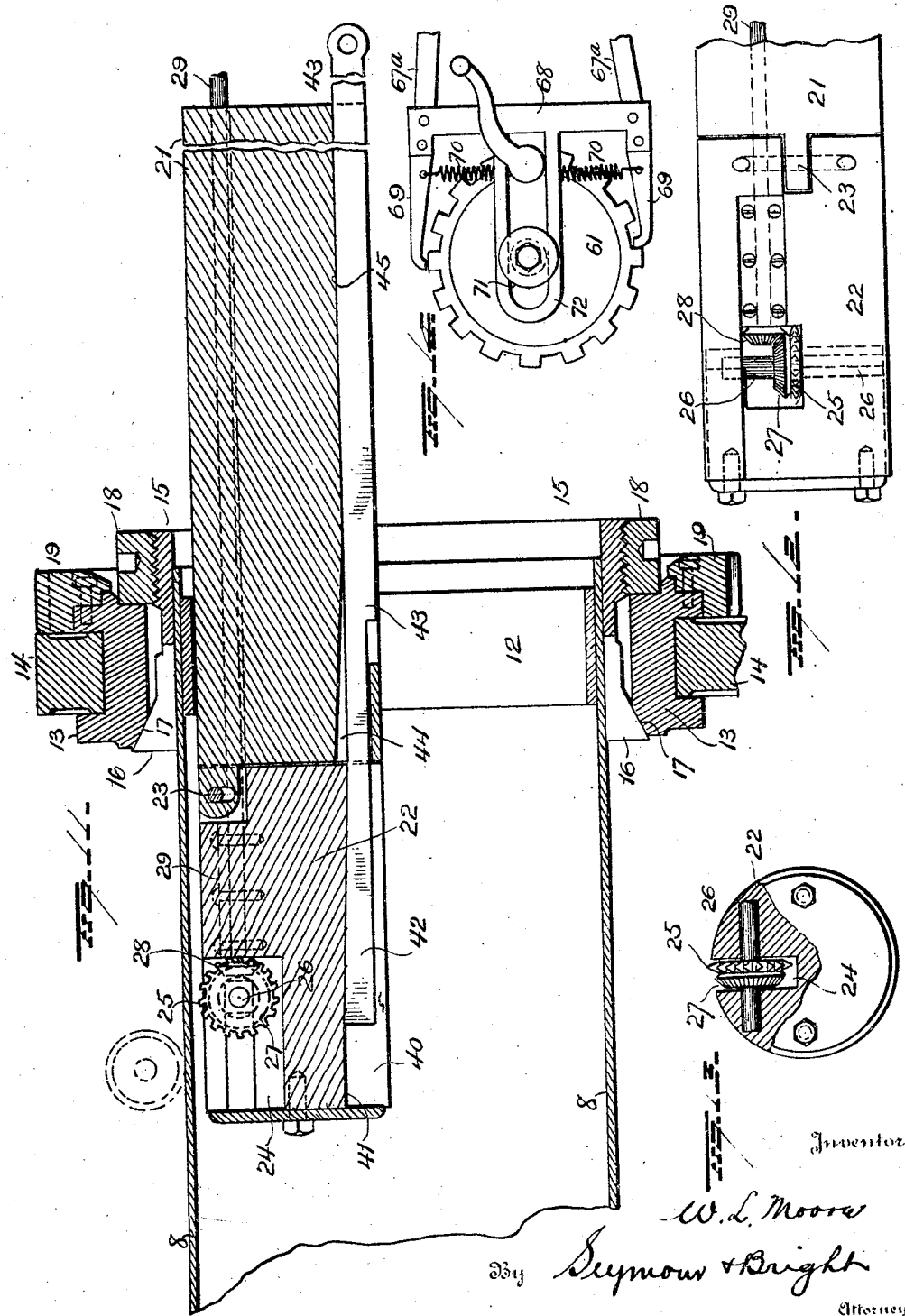

Patented July 6, 1926.

1,591,874

UNITED STATES PATENT OFFICE.

WILLIAM L. MOORE, OF LEXINGTON, TENNESSEE, ASSIGNOR TO JONES STRAINER MANUFACTURING COMPANY, OF MEMPHIS, TENNESSEE, A CORPORATION OF TENNESSEE.

METAL-WORKING MACHINE.

Application filed January 20, 1922. Serial No. 530,633.

This invention relates to improvements in metal working machines and more particularly to such as are adapted for cutting slits in metal tubing, especially in the manufacture of strainer tubes of the type shown by Letters Patent No. 1,135,809 granted April 13th, 1915, to Eli Jones.

One object of my invention is to provide means which shall operate effectually and accurately to cut parallel rows of short slots longitudinally of the tube, and to so construct a machine for the purpose stated that its operation shall be automatic in moving the tube and cutters.

A further object is to provide simple and efficient means for causing longitudinal movement of the carriage on which the tube is mounted; for automatically reversing the direction of the carriage whereby the carriage is caused to reciprocate; for cutting slits in the tube; for automatically moving the cutters whereby the slits of each line will be spaced apart, and for turning the tube slightly approximately at each end of the travel of the carriage.

With these and other objects in view, the invention consists in certain novel features of construction and combinations of parts as hereinafter set forth and pointed out in the claims.

In the accompanying drawings: Figure 1 is a front view of a machine embodying my improvements; Figure 2 is a plan view; Figure 3 is a rear view; Figure 4 is an end view; Figure 5 is a transverse sectional view on the line 5—5 of Figure 1; Figure 6 is a sectional view illustrating the spacing mechanism and parts of the reversing mechanism; Figure 7 is a detail view showing parts of the reversing mechanism; Figures 8, 9 and 10 are detail views of parts of the spacing mechanism; Figure 11 is a sectional view showing the cutter head and tube clamping means; Figure 12 is a view in elevation showing the cutter head; Figure 13 is a view partly in transverse section of the cutter head; Figure 14 is a detail view of a portion of the mechanism for moving the carriage and tube longitudinally and Figures 15 and 16 are enlarged detail views illustrating the micrometer adjuster devices.

In the drawings I have illustrated a main frame 1 provided with parallel guides 2 upon which a carriage 3 is mounted to move longitudinally. At or near one end of the carriage, an upright frame 4 is secured and through the top of this frame, a rod 5 passes, said rod carrying at its lower end, a pulley 6 for the accommodation of an endless chain 7 which constitutes a saddle or support for one end of a metal tube 8 to be slotted, and suitable concave rollers 9 may also be provided to receive said tube near its other end. A spring 10 is located on the rod 5, and an abutment 11 is provided near the upper end of the rod for one end of said spring—the lower end of the latter bearing upon the top of frame 4. Thus it will be seen that one end of the tube is yieldingly supported in such manner that it can be turned. Within the end portion of the tube farthest from the saddle 7 a ring 12 is placed and around and spaced from the tube is a wheel or external ring 13 mounted in a suitable bearing member 14 on the carriage. Intermediate of the external ring 13 and the tube 8, a sleeve 15 is provided and from this sleeve a plurality of wedges 16 project,—the beveled faces of said wedges being cooperable with a beveled face or faces 17 of the external ring 13. A collar 18 is threaded on the sleeve 15 and adapted to bear against one face of the ring 13, so that by turning said collar, the sleeve 15 will be moved longitudinally and the cooperation of the wedges 16 with the beveled face or faces 17 will cause the work (the tube 8) to be clamped to the wheel or ring 13. A toothed or ratchet wheel 19 is secured to the external ring 13 and is operable, as hereinafter explained, to cause the latter and the tube to be turned step by step at the end of each reciprocation of said tube.

An upright frame 20 is provided at one end of the main frame 1 and supports a shaft or bar 21, to the free end of which, a cutter head 22 is hinged as indicated at 23, Figures 11 and 12. The cutter head enters the tube as shown in Figure 11 and is recessed as at 24 for the accommodation of a milling cutter 25 operable to slit the tube from the interior thereof. The cutter 25 is carried by a short shaft 26 mounted in the cutter head and this same shaft carries a beveled pinion 27 rotatable with the cutter 25. The pinion 27 is driven by a bevel pinion 28 secured to the forward end of a long, flexible shaft 29 passing through a groove 30 in the shaft or bar 21 and entering the hinged cutter head. The rear end of the shaft 29 carries a pulley 31 to which motion is imparted by a belt 32 from a motor 33.

The shaft 29 also carries a worm 34 which transmits motion to a worm wheel 35 mounted in the framework 20, and a beveled pinion 36 rotatable with said worm wheel transmits motion to a beveled gear 37 on a shaft 38, to which latter a cam drum 39 is secured.

The cutter head 22 is provided in its under side with a groove 40, the top wall 41 of which is inclined. A wedge 42 enters the groove 40 so as to engage the inclined wall 41 and the shank or rod 43 of this wedge, after passing through a hole 44, extends rearwardly in a groove 45 in the under side of the shaft or bar 21. The rear end of the shank or rod 43 is connected with an arm 46 provided with a pin 47, which is held in a cam groove 48 in the drum 39 by the action of a weighted arm 49. With such construction, the cam groove 48, during the rotation of the drum 39, will cause longitudinal movement of the wedge 42 to move the cutter head in a manner to present the cutter 25 to the wall of the tube to effect the cutting of a short slot partly through the wall of the same and then to permit the cutter head and cutter to recede as the wedge is caused to move backwardly by the action of the cam groove 48. In this manner, a row of partial slits spaced apart are formed in the inner wall of the tube approximately from one end of the tube to the other while it is traveling longitudinally. The completion of the slits are formed by an upper milling cutter 50. This cutter is carried by a tubular arm 51 carried by a shaft 52 mounted in suitable supports on the main frame 1. The shaft of the cutter 50 carries a pulley 53 to receive a driving belt 54 which also passes over pulleys 55 at the opposite end of the main frame, and over a pulley 56 rotatable with the drive pulley 31, and thus the upper milling cutter is driven. The upper cutter 50 serves to complete the slits in the tube, which are partially formed by the inner cutter 25 as previously explained. It has hereinbefore been explained how the inner cutter is moved toward and away from the wall of the tube in forming the short slits or grooves, and it is also necessary that the upper cutter 50 be moved in like manner and for the same purpose. To accomplish the intermittent movements of the upper cutter relatively to the work, the shaft 52 is provided with an arm 57 carrying a roller 58 to cooperate with a cam 59 on the drum 39, so that as the latter rotates, the shaft 52 will be caused to oscillate and the upper milling cutter to be allowed to move toward the work and engage the same while the roller 58 is engaging the concentric portion of the drum 39 and to be moved away from the work when the cam 59 cooperates with the roller 58 on arm 57.

For effecting the travel of the carriage to reciprocate the tube, the instrumentalities now to be explained may be employed: A grooved drum 60 is mounted freely on a transverse shaft 60ª mounted in the framework 1 and a ratchet wheel 61 is rotatable with said drum. A cable 62 is wound about the drum 60 and its ends are connected respectively to respective ends of the carriage 3. A slide 62ª mounted on the main frame 1 is provided with a pin 63 which enters a cam groove 64 in the drum 39 so that as the latter rotates, the slide 62 will be reciprocated. A link 65 is pivotally connected at its lower end to the main frame 1 and at its upper end to the slide 62. Between its ends, this link is provided with an elongated slot 66 to facilitate the attachment thereto of one end of a pitman 67. The pitman 67 is provided with forked arms 67ª connected at their forward ends by a cross piece 68. Dogs 69 are pivotally connected with respective end portions of the cross piece 68 and are caused, by springs 70, to cooperate with the ratchet wheel. The construction is such that only one of the dogs 69 will engage the ratchet wheel at a time, so that during the reciprocating movements of the pitman, the ratchet wheel and drum will be rotated step by step to cause the carriage and tube to move in one direction. Means are provided however, for automatically shifting the dogs when the carriage reaches one end of its travel so that the carriage will then be caused to travel in the reverse direction: The devices for effecting reversal of travel of the carriage will now be explained: The end of the shaft 60ª carries a stud 71 which is eccentric to the axis of said shaft and this stud is received in the elongated slot of a slotted arm 72 projecting from the cross piece 68. At its opposite end, the shaft 60ª has secured rigidly thereto, a disk 73 having peripheral notches forming shoulders 74 to be engaged by pawls 75 carried by the flanged portion of a pinion 76, the latter being freely mounted on the projecting portion of the shaft 60ª. A rack bar 77 is movable through guides 78 on the main frame 1 and meshes with the pinion 76, a stop 79 being provided to limit the movement of said rack bar in one direction. The rack bar 77 is provided with an arm 80 having a head 81 formed with two curved edges 82 to cooperate with pins 83 on the disk 73 properly to center the latter. The ratchet bar is movable in one direction by the action of a spring 84 attached at one end to the main frame 1 and at the other end to an arm 85 on the rack bar 77. It will be seen that when the rack bar is moved in one direction, the disk 73 will be turned and turning movement will be imparted to the shaft 60ᵃ, causing the eccentric connection of the cross piece 68 with said shaft, (through the medium of the slotted arm 72 and eccentric lug 71) to shift the dogs 69, so that one of them will be moved away from the ratchet wheel 61 and the other moved into cooperative relation to the latter, thus causing reversal of rotation of the drum 60 and hence effecting reversal of travel of the carriage and the work (tube) thereon. A rod 86 is connected at one end with its rack bar 77 and at the opposite end said rod is connected with one arm of a lever 87, the other arm of said lever being cooperable with a cam 88 at one end of the cam drum 39. A bar or strip 89 is slidingly mounted on one side of the main frame 1 and is provided near its respective ends with stop lugs 90 to be engaged by an arm 91 mounted on the carriage. One end of the slide bar or strip 89 is pivotally connected with a pivoted latch 92, the latter being adapted to engage the rod 86 (or the lever 87 attached thereto) and hold the same against the resistance of the spring 84. When the carriage reaches one end of its travel, the arm 91, depending therefrom, will engage one of the stops 90 and cause movement of the bar or strip 89 to operate the trip or latch 92 and thus release the rod 86, permitting the operation of the rack-and-pinion devices by the action of the spring 84 and the consequent reversal of the driving means for the carriage. When the reversing mechanism thus operates, the cam 88 will have reached the pivoted lever 87, permitting the latter to assume the position shown in Figure 1. As the cam drum continues to turn, the cam 88 will operate to turn the lever 87 on its fulcrum, thus moving the rod 86 and rack bar 77, turning the pinion 76 backwardly without imparting movement to the disk 73 and shaft 60ᵃ, and causing the spring 84 to be put under tension and the rod 86 to be connected with the trip 92. The parts will then be in position to be again operated automatically to reverse the movement of the carriage when the latter reaches the other end of its travel.

At approximately the same time or slightly prior to that the reversal of travel of the carriage takes place, the tube must be slightly turned so that the next row of slits in the tube may be made as the carriage travels in the reverse direction. Such turning of the tube may be effected automatically by the operation of the devices now to be explained.

The top of the main frame 1 is provided with a central longitudinal opening 93 providing a slot formation extending substantially the length of the frame, and which has a cam portion 93ᵃ (Fig. 6) into which depends a roller 94 mounted on an arm 95 depending from a longitudinally movable cam bar or shot-bolt 96, the latter being so mounted that its movements will be lateral with respect to the frame. The cam bar is mounted to move in guides 97 on the carriage and disposed under the ratchet wheel 19 on the tube holding ring 13. The bar 96 is provided on its upper face with a cam 98 to engage the heel 99 of a dog 100, one arm of the latter having an elongated slot 102 for the passage of a pin 103 projecting from a frame or bracket 104 on the carriage, and the other arm of said dog is provided with a tooth 105 to engage the ratchet wheel 19. The slide bar 96 is also provided with a notch 106 to be engaged by the tooth 106ᵃ of a latch 107,—a spring-actuated lever 108 tending to press said latch downwardly. As the carriage travels forwardly (or backwardly), the cam 93ᵃ in the opening 93 of the bed of frame, displaces the roller 94 and thereby shifts the bar 96 until the tooth 106ᵃ engages the notch 106 and securely holds the bar against lateral return. The latch 107 is made with a curved arm 109, over which a shouldered block 110 is provided to engage a shouldered portion 111 on the arm 109, and limiting block 110 is adjustably secured to the depending arm 91. The arm 91 is pivotally attached at 112 to the frame or bracket 104 so as to be capable of swinging laterally with relation to the carriage, and said depending arm 91 carries a pin or roller 113 over which the curved arm 109 of the latch 107 projects. Two strip members 114, 114 longitudinally adjustable along one side of the bed 1, are secured thereto and are connected by pivoted arms 115, the latter being connected by pivoted links 116. Each strip member is provided with a wedge 117 to be engaged by the depending arm 91 on the carriage to shift the lower end of said arm laterally when the carriage approaches one or the other end of its travel. A spring 118 is arranged to press against an arm 119 on the slide or cam bar 96 and operates to move said bar when it shall have been released by the latch 107.

When the carriage approaches one or the other end of its travel, the lower end of the arm 91 on the carriage will be moved laterally by engagement with one of the wedges 117, whereupon the pin or roller 113, cooperating with the curved arm 109 of the latch 107, will release the latter sufficiently to raise the cam bar or slot bolt 96. The latter will now be moved rapidly by the action of the spring 118, and the cam 98 on the bar or bolt 96 cooperating with the dog 100 will cause the tooth 105 of the latter to engage the ratchet wheel 19 and turn the same and the tube (or work) one tooth and space to provide for the cutting of another row of slits during the next travel of the carriage. In order to hold the ratchet wheel and tube from being turned after it has been moved by the latch 107, a spring arm 120 is secured to the bracket 104 and carries a roller 121 to engage and hold said ratchet wheel.

In order to bring the cutter head accurately into operative position, I provide a micrometer adjuster, including an arm 122 pivoted to a bracket 123 by a suitable pin 124. Pivotally mounted on the bracket 123 is a member 125 carrying a screw 126, which latter enters into a suitable socket in a connecting rod 127, the other end of which rod engages with one arm 128 of a pivoted lever,—the other arm 129 of said lever being connected by means of a link 130 with one end of the wedge rod 43 as shown in Figure 3.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a machine of the character described, the combination with a cutter head to enter a tube to be slit, a milling cutter carried by said cutter head, and means for rotating said cutter, of automatically operated means for moving said cutter toward and away from the wall of the tube, and means operable simultaneously with the cutter and said first-mentioned means for moving the tube longitudinally.

2. In a machine of the character described, the combination with a cutter head to enter a tube to be slit, a milling cutter carried by said cutter head and means for rotating said cutter, of automatically operated means for moving said cutter toward and away from the wall of the tube, means operable simultaneously with the cutter and said first-mentioned means for moving the same longitudinally, and means operable automatically to reverse the direction of movement of the tube at each end of the travel thereof.

3. In a machine of the character described, the combination with a cutter head to enter a tube to be slit, a milling cutter carried by said cutter head, and means for rotating said cutter, of automatically operated means for moving said cutter toward and away from the wall of the tube, means operable simultaneously with the cutter and said first-mentioned means for moving the same longitudinally, means operable automatically to reverse the direction of movement of the tube at each end of the travel thereof, and means operable automatically to turn the tube a limited distance approximately at each end of the travel thereof.

4. In a machine of the character described, the combination with a cutter head to enter a tube to be provided with slits, a cutter carried by said cutter head, means for rotating said cutter, and means for moving the tube longitudinally, of an outer cutter operable in conjunction with the first-mentioned cutter to form slits in the tube, and mechanisms operable automatically to move both cutters toward and away from the wall of the tube, whereby the tube may be provided with a row of slits spaced apart.

5. In a machine of the character described, the combination with a cutter head to enter a tube to be provided with slits, a cutter carried by said cutter head, means for rotating said cutter, and means for moving the tube longitudinally, of an outer cutter operable in conjunction with the first-mentioned cutter to form slits in the tube, mechanisms operable automatically to move both cutters toward and away from the wall of the tube, and means operable automatically to turn the tube slightly approximately at each end of its travel.

6. In a machine of the character described, the combination with a main frame, and a carriage movable thereon, of a saddle for supporting one end portion of a tube, clamping means for the other end of the tube, means for moving said carriage alternately in opposite directions, means for cutting spaced slits in the wall of the tube during the travel of the carriage, and means cooperable with said clamping means and operable automatically approximately at each end of the travel of the carriage to turn the tube.

7. In a machine of the character described, the combination with a main frame, a carriage mounted to travel thereon, and means for supporting a tube on said carriage, of a cutter head, a cutter carried thereby, means for supporting said cutter head within the tube supported on the carriage, of a shaft passing through said supporting means and geared to said cutter, an outer cutter, a shaft for the latter, a source of power, and means for driving each of said shafts and both driven from said source of power.

8. In a machine of the character described, the combination with a main frame, a carriage mounted to travel thereon, and means on said frame for supporting a tube, of cutting means for forming rows of slits in the wall of said tube, driving means, a cam drum geared to said driving means, a drum mounted on the frame, a cable wound on said last-mentioned drum and connected at its respective ends to respective ends of said carriage, a ratchet wheel rotatable with said last-mentioned drum, a pitman, dogs carried by said pitman for cooperation with said ratchet wheel, a pivoted link with which said pitman is connected, a slide with which said link is connected, a pin on said slide and cooperable with a cam of said cam drum, and means operable automatically to shift said dogs to reverse the direction of travel of the carriage.

9. In a machine of the character described, the combination with a main frame, a carriage mounted to travel thereon, and means on said frame for supporting a tube, of cutting means for forming rows of slits in the wall of said tube, driving means, a cam drum geared to said driving means, a drum mounted on the frame, a cable wound on said last-mentioned drum and connected at its respective ends to respective ends of said carriage, a ratchet wheel rotatable with said last-mentioned drum, a pitman, dogs carried by said pitman for cooperation with said ratchet wheel, a pivoted link with which said pitman is connected, a slide with which said link is connected, a pin on said slide and cooperable with a cam of said cam drum, a shaft on which the cable drum and ratchet wheel are loosely mounted, a slotted arm connected with said pitman between the dogs connected with the pitman, means connecting said arm eccentrically with the cable drum shaft, rack-and-pinion mechanism cooperable with said shaft to turn the latter and effect reversal of said dogs, a spring for moving the rack bar in one direction, a trip device for the rack bar, means operable by the carriage to operate said trip device, and means for returning the rack bar against the resistance of said spring.

10. In a machine of the character described, the combination with a main frame, a carriage thereon, means for reciprocating said carriage, and cutting means for cutting spaced slits in the wall of a tube, of means near one end of the carriage for supporting one end portion of the tube, rotatable holding means to receive the other end portion of the tube, a ratchet wheel on said holding means, a spring actuated cam bar mounted on the carriage, a dog mounted on the carriage for cooperation with said ratchet wheel and operable by said cam bar to cause the holding means to turn, a latch for holding said cam bar against the tension of its spring, a depending arm pivoted to the carriage and carrying a stud under a part of said latch, an adjustable stop for the latch, and a wedge carried by the main frame for moving the pivoted arm to operate the latch and release said spring-actuated cam bar.

11. In a machine of the character described, the combination with a main frame, a carriage and means for reciprocating the carriage, of a support, a cutter head hinged to said support and adapted to enter tubular work on the carriage, a cutter carried by said cutter head, a driving shaft geared to said cutter, a longitudinally movable wedge bar cooperable with the cutter head to move the same relatively to the wall of the tubular work, cam means for reciprocating the wedge bar, a micrometer adjusting device, and connections between said adjusting device and said wedge bar.

In testimony whereof, I have signed this specification.

WILLIAM L. MOORE.